(12) United States Patent
Zhang et al.

(10) Patent No.: US 8,265,057 B2
(45) Date of Patent: Sep. 11, 2012

(54) ENHANCED VOICE PRE-EMPTION OF ACTIVE PACKET DATA SERVICE

(75) Inventors: Dan Zhang, Vernon Hills, IL (US); Vivek G. Naik, Deerfield, IL (US); Shreesha Ramanna, Vernon Hills, IL (US)

(73) Assignee: Motorola Mobility LLC, Libertyville, IL (US)

( * ) Notice: Subject to any disclaimer, the term of this patent is extended or adjusted under 35 U.S.C. 154(b) by 2001 days.

(21) Appl. No.: 10/814,831

(22) Filed: Mar. 31, 2004

(65) Prior Publication Data

US 2005/0226202 A1   Oct. 13, 2005

(51) Int. Cl.
H04J 3/24 (2006.01)

(52) U.S. Cl. ......... 370/349; 370/310; 370/345; 455/502

(58) Field of Classification Search .................... 370/349
See application file for complete search history.

(56) References Cited

U.S. PATENT DOCUMENTS

| | | | | |
|---|---|---|---|---|
| 5,606,595 A * | 2/1997 | Ejzak | ........................... | 370/349 |
| 5,726,984 A * | 3/1998 | Kubler et al. | ................. | 370/349 |
| 5,768,531 A | 6/1998 | Lin | | |
| 6,377,790 B1 * | 4/2002 | Ishii | ........................... | 455/343.1 |
| 6,694,134 B1 * | 2/2004 | Lu et al. | ........................ | 455/419 |
| 6,748,247 B1 * | 6/2004 | Ramakrishnan et al. | ..... | 455/574 |
| 6,804,518 B2 * | 10/2004 | Core et al. | ..................... | 455/436 |
| 6,822,952 B2 * | 11/2004 | Abrol et al. | .................... | 370/338 |
| 7,043,249 B2 * | 5/2006 | Sayeedi | ........................ | 455/445 |
| 2002/0110106 A1 * | 8/2002 | Koo et al. | ..................... | 370/341 |
| 2002/0161914 A1 * | 10/2002 | Belenki | ........................ | 709/235 |
| 2002/0167905 A1 * | 11/2002 | Wenzel et al. | ................. | 370/249 |
| 2002/0176558 A1 * | 11/2002 | Tate et al. | ................. | 379/215.01 |
| 2003/0079021 A1 * | 4/2003 | Fan | ................................ | 709/227 |
| 2003/0099219 A1 * | 5/2003 | Abrol et al. | ................... | 370/338 |
| 2003/0128664 A1 * | 7/2003 | Connor | ......................... | 370/229 |
| 2003/0152049 A1 * | 8/2003 | Turner | .......................... | 370/331 |
| 2003/0232629 A1 * | 12/2003 | Jang et al. | .................. | 455/552.1 |
| 2004/0022209 A1 * | 2/2004 | Misra et al. | .................... | 370/328 |
| 2004/0136392 A1 * | 7/2004 | Diachina et al. | .............. | 370/431 |
| 2005/0044240 A1 | 2/2005 | DePree | | |
| 2005/0190754 A1 | 9/2005 | Golikeri et al. | | |
| 2005/0226202 A1 * | 10/2005 | Zhang et al. | ................... | 370/349 |

(Continued)

FOREIGN PATENT DOCUMENTS

EP   1 161 036 A1   5/2001

(Continued)

OTHER PUBLICATIONS

Electronic Industries Alliance; TR45 Data Service Options for Spread Spectrum Systems: High Speed Packet Data Services; XP-002183111; Mar. 1999.

(Continued)

*Primary Examiner* — Lester Kincaid
*Assistant Examiner* — Diego Herrera
(74) *Attorney, Agent, or Firm* — Roland K. Bowler, II

(57) ABSTRACT

A method in wireless communication devices, for example, a cellular handset, including receiving a network control message, forcing an active packet session into a dormancy state in response to receiving the network control message, suspending a dormancy timer after receiving the network control message, and starting the dormancy timer upon completion of an event, for example, a voice pre-emption, that precipitated suspension of the active packet session.

17 Claims, 3 Drawing Sheets

U.S. PATENT DOCUMENTS

| | | |
|---|---|---|
| 2006/0029083 A1 | 2/2006 | Kettlewell et al. |
| 2006/0209799 A1 | 9/2006 | Gallagher et al. |
| 2007/0202891 A1 | 8/2007 | Diachina et al. |
| 2008/0219198 A1* | 9/2008 | Honkasalo et al. ........... 370/311 |

FOREIGN PATENT DOCUMENTS

| | | |
|---|---|---|
| EP | 1161036 A1 * | 12/2001 |
| WO | 2004014035 A1 | 2/2004 |

OTHER PUBLICATIONS

PCT Search Report; CS28340P/PCT/US07163575; April 21, 2008; 9 Pages.

Extended European Search Report; EP06290856; June 14, 2008; 7 Pages.

USPTO U.S. Appl. No. 11/459,878, filed August 25, 2006, Motorola.

USPTO Non-Final Rejection U.S. Appl. No. 11/459,878; January 10, 2009; 20 Pages.

U.S. Appl. No. 11/459,878; Office Action Response; April 7, 2009; 11 Pages.

USPTO Final Rejection U.S. Appl. No. 11/459,878; July 8, 2009; 16 Pages.

U.S. Appl. No. 11/459,878; Appeal Notice; September 18, 2009; 1 Page.

U.S. Appl. No. 11/459,878; Pre-Appeal Brief Review Request; September 18, 2009; 5 Pages.

UMA Protocols (Stage 3) R1.0.3 (Feb. 26, 2005); Technical Specification; Unlicensed Mobile Access (UMA); Protocols (Stage3); Chapters 6,9; XP-002387160.

3GPP TS 44.318 V6.7.0 (Dec. 2006); 3rd Generation Partnership Project; Technical Specification Group GSM/Edge Radio Access Network; Generic Access (GA) to the A/Gb Interface; Mobile GA Interface Layer 3 Specification (Release 6).

* cited by examiner

ENHANCED VOICE PRE-EMPTION OF ACTIVE PACKET DATA SERVICE

FIELD OF THE DISCLOSURE

The present disclosure relates generally to wireless communications and, more particularly, to the suspension of an active packet data session, for example, by voice preemption, in cellular communications handsets and resumption of the suspended packet session, and methods.

BACKGROUND OF THE DISCLOSURE

Wireless communications devices in packet networks, for example, CDMA 1x service networks, use a dormancy timer to prevent frequent re-origination of packet sessions from the mobile wireless communications devices within the duration of the dormancy timer. The dormancy timer normally begins when the wireless communications device enters the dormancy state some period after completion or suspension of a packet session. The dormancy timer allows the communications infrastructure to properly release system resources before the wireless communications device attempts to re-establish a packet session. In CDMA 1x and other packet networks, the duration of the dormancy timer is controlled by a system control message transmitted to the wireless communications device from the base station controller (BSC).

In cellular communications systems, incoming voice and messages among other events will preempt an active packet session. For example, voice pre-emption of packet data (VPAD) service allows the system to deliver a voice call to a wireless communications device actively engaged in a packet data call. Pre-emption of the packet session forces the wireless communications station into the dormancy state, during which the packet session is suspended, to permit setting up the voice call, messaging application, or other service or application that triggered suspension of the packet session.

Whenever a packet session is forced into the dormancy state, the dormancy timer begins and continues to run during the service or application associated with the event that caused suspension of the packet session. If the dormancy timer expires during the current active service or application, for example, during a voice call, the mobile wireless communications device will attempt to re-establish the packet session immediately upon completion of the voice call. The attempt to re-establish the packet session may fail however for lack of sufficient time for the network to release resources associated with the voice call. Similar issues may arise if the dormancy timer expires shortly after completion of the voice call. Failed packet session setups are undesirable, generally, and tend to interfere with other services and applications.

The various aspects, features and advantages of the disclosure will become more fully apparent to those having ordinary skill in the art upon careful consideration of the following Detailed Description thereof with the accompanying drawings described below.

DETAILED DESCRIPTION

Figure 1:
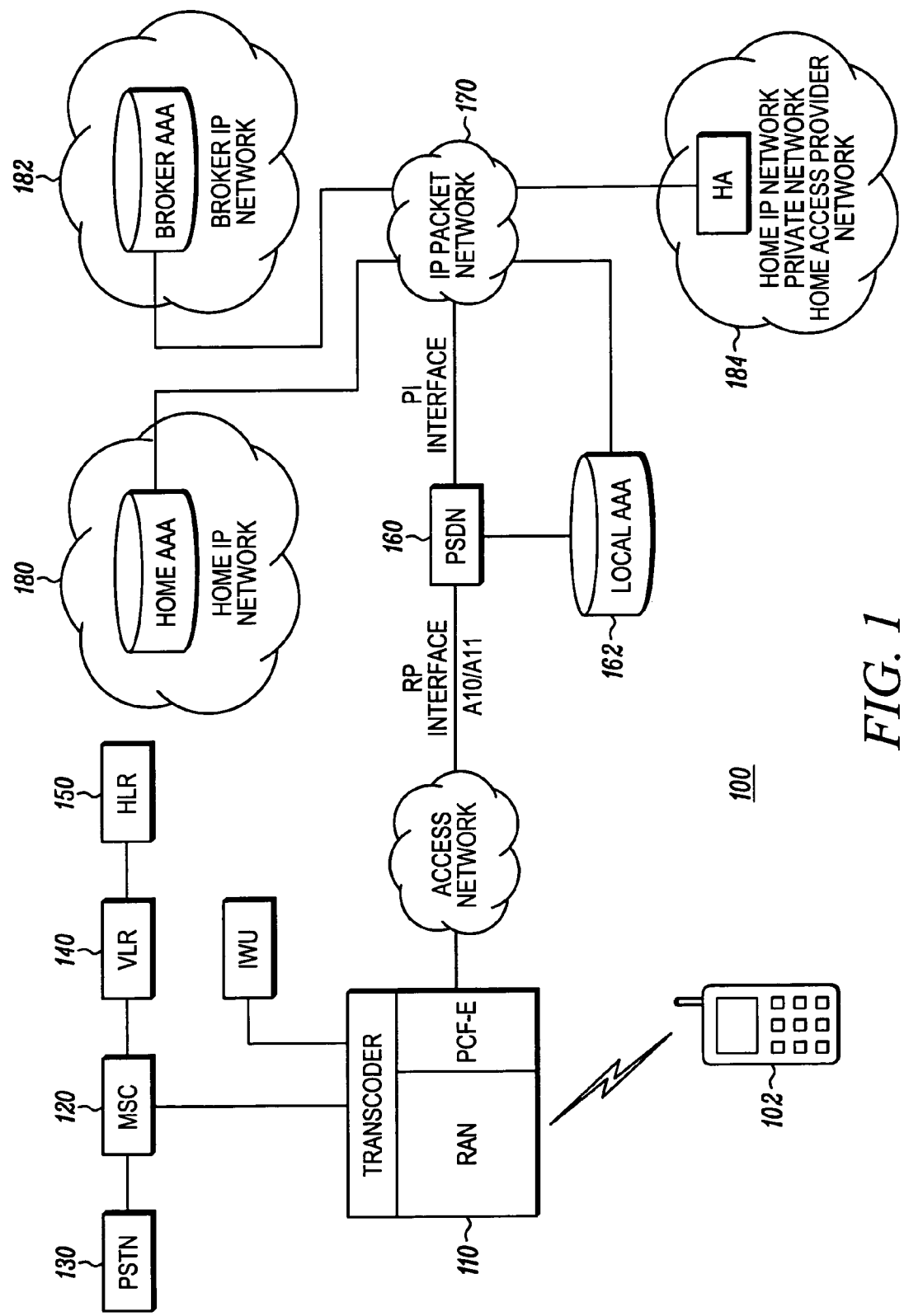
FIG. 1 illustrates an exemplary communications network.

FIG. 1 illustrates an exemplary wireless communications network 100 including infrastructure for a Code Division Multiple Access (CDMA), for example, a CDMA 2000 1x protocol network. The exemplary network infrastructure comprises a radio access network (RAN) 110 that includes at lease one base station controller (BSC) communicably coupled to a plurality of base transceiver stations (BTS), which are not shown but are well known in the art. The base transceiver stations support wireless communications with mobile stations in corresponding geographical areas of the network, also known as cells or cellular areas. In FIG. 1, a switch 120, for example, a CDMA Mobile Switching Center (MSC), communicably interconnects the RAN 110 to a Public Switched Telephone network (PSTN) 130. The switch 120 also communicably couples the RAN 110 to a visitor location register (VLR) 140 and to a home location register (HLR) 150, the character and function of which are well known to those having ordinary skill in the art.

The RAN 110 is also coupled to a Packet Data Serving Node (PDSN) entity 160 interconnecting the one or more base station controllers of the RAN to an IP packet network 170, like the Internet. In some embodiments, an authentication, authorization and accounting (AAA) entity 162 interconnects the PDSN entity 160 and the IP packet network 170. The exemplary IP packet network 170 is coupled to various other networks, for example, to a home IP network 180 and to a broker IP network 182 both of which include a corresponding AAA entity. The IP packet network 170 is also coupled to network 184 including a home agent (HA), which is a required component for mobile IP applications that run on some home or private networks. The exemplary CDMA network also includes an inter-working unit (IWU), among other infrastructure, which is well known to those having ordinary skill in the art. In FIG. 1, mobile or fixed wireless station 102 is connected to the network and communicates via the network with other devices and entities in switched and packet modes of operation.

Figure 2:
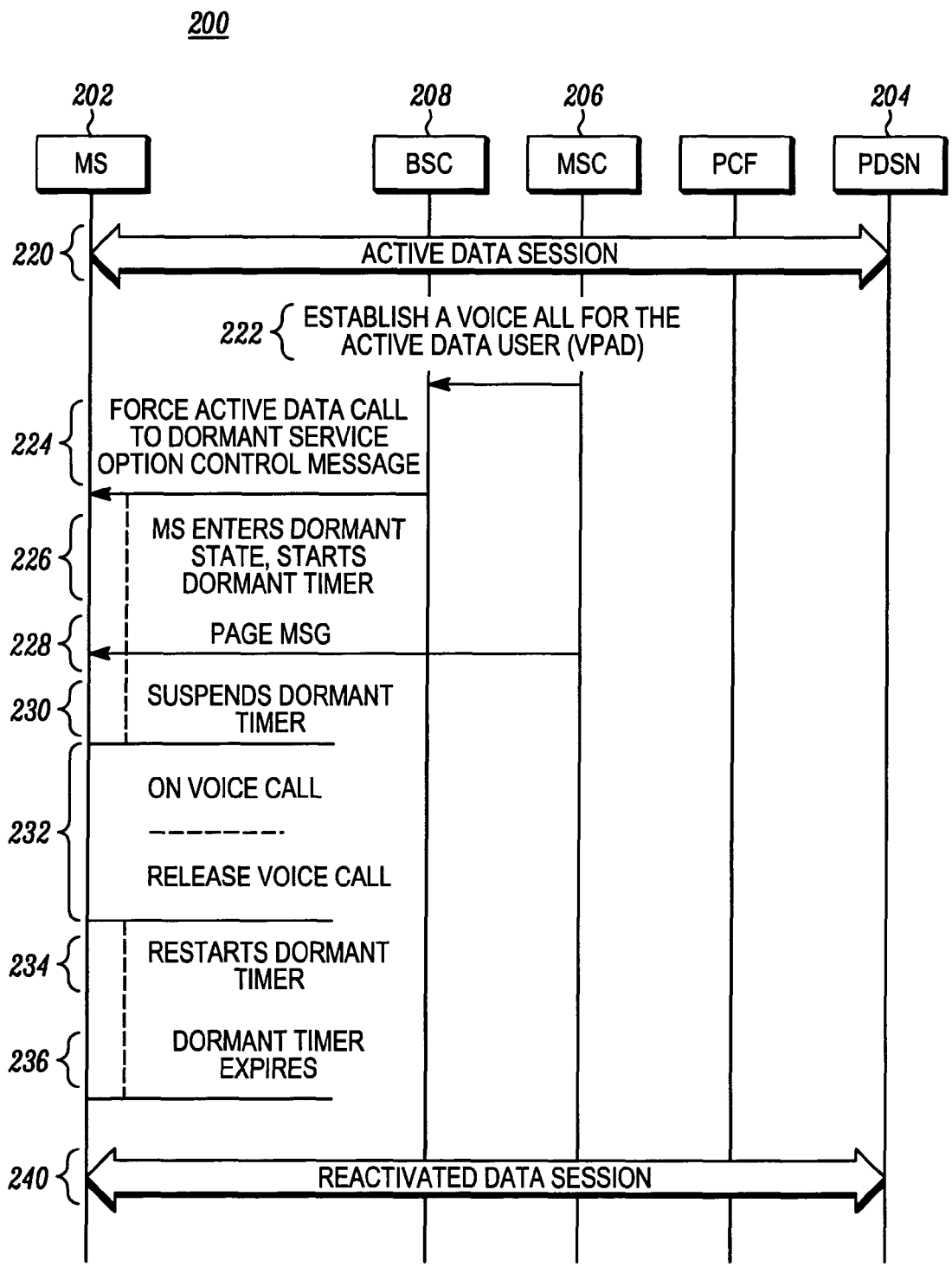
FIG. 2 is an exemplary communication ladder between exemplary network entities.

In the exemplary communications sequence 200 of FIG. 2, a wireless communications mobile station (MS) 202 is connected to a packet network, for example, the IP packet network 170 of FIG. 1 (not illustrated in FIG. 2), via the PDSN 204. During packet session 220, data packets are transferred to and/or from the MS 202 and the packet network via the PDSN 204. In the process flow diagram 300 of FIG. 3, the wireless communications device is in an active packet session at 310.

In some embodiments, the active packet session 220 is forced into a dormancy state by a dormancy-invoking event. In the exemplary sequence of FIG. 2, at 222, the dormancy-invoking event is an incoming voice call initiated by another entity and communicated to the MS 202 via the MSC 206. In FIG. 2, the incoming call is communicated between the MSC 206 and the BSC 208. In other embodiments, however, other events may trigger release or preemption of the active data session. Exemplary events that may trigger release of the data call 220 include incoming messages, for example, EMS, SMS, MMS or some other format messages, e-mail messages, among other messages. Other events may also preempt an active packet session, for example, the receipt of an incoming facsimile in devices supporting the service. Other services that could preempt an active data session include an Emergency Callback, an Over the Air Service Provisioning (OTASP), etc. Thus generally an active data or packet session in progress will be preempted by different events, e.g., services and applications, available over the network. In the process flow diagram of FIG. 3, the event that triggers release of the data session is indicated at block 320, and the data session or call is forced into dormancy at block 330.

Generally, upon the occurrence of the packet session pre-empting event, the network communicates with the wireless communications device. In FIG. 2, at 224, for example, the BSC 208 transmits a service option control message to the MS 202 that includes, among other information, dormancy timer information, e.g., the dormancy period, which is used to set the dormancy timer.

In FIG. 2, at 226, the active packet session of the wireless communications device 202 enters the dormant state and the dormancy timer is started, for example, based on dormancy timer information provided by the network in the control message. In another embodiment, the packet session is suspended, but initiation of the dormancy timer is delayed, as discussed further below. In FIG. 2, at 228, the MSC 206 sends a page to the MS 202 indicating that there is a pending voice call, message, facsimile, emergency call-back, etc. depending upon the event triggering suspension of the packet session. In the exemplary process of FIG. 3, the wireless communications device receives a page, for example, a voice call page, at block 340.

Figure 3:
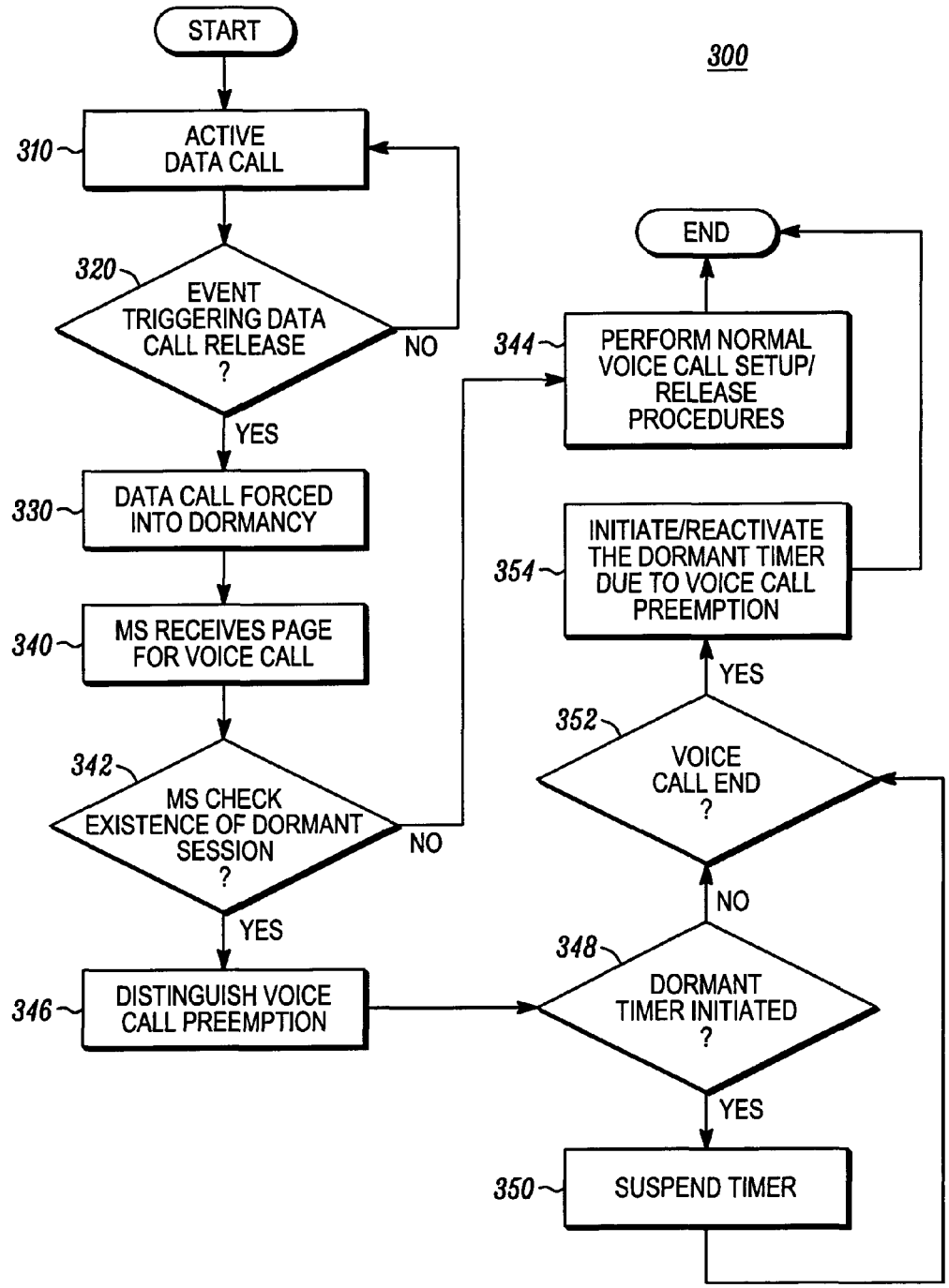
FIG. 3 is an exemplary process flow diagram.

In FIG. 3, at block 342, if a packet session has not been suspended, the voice call setup and release is indicated at block 344. In other embodiments, the processing at block 344 could be different, for example, it could be the setup for reception of a pending facsimile, emergency call-back, SMS message, etc. If an active packet session has been forced into dormancy, as indicated at block 330, the process proceeds otherwise. Generally, the dormancy timer is suspended for any event that preempts a packet session. Suspension of the dormancy timer prevents attempts to reactivate the packet session during the service or application associated with the event and ensures proper release of network resources before re-activating the packet session after completion of the service or application, for example, the voice or emergency call-back, SMS application or facsimile application session, etc., that triggered suspension of the packet session.

In FIG. 2, at 230, the MS suspends the dormancy timer if it was previously started at 226. In the exemplary embodiment, the dormancy timer is suspended after receiving the page at 226 and before engaging the voice call at 232. In other embodiments, the dormancy timer is suspended before it expires, for example, sometime after starting the service or application associated with the event (e.g., a pending voice call) that preempted the active packet session. In FIG. 3, at block 346, the communications device distinguishes the event (e.g., pending voice call) that triggered suspension of the active packet session. In other embodiments, other events are identified at block 346, examples, of which were discussed above. The service or application, e.g., voice call, associated with suspension of the active packet session is run or executed. In FIG. 3 at block 348, a determination is made as to whether the dormancy timer has been initiated or started. If so, at block 350, the dormancy timer is suspended. The process proceeds to determine whether the voice call or other service or application has ended at block 352.

In FIG. 3, at block 354, upon completion of the voice call, the dormancy timer is initiated or restarted. In one embodiment, the initiated or restarted dormancy timer runs for the full dormancy time period whether or not it was initiated previously. In another embodiment, where the dormancy timer was started previously and interrupted, the dormancy timer is restarted and runs for only the time remaining. In other embodiments, the dormancy timer is initiated or restarted and runs for a different period than the original dormancy timer. FIG. 2 illustrates initiation or re-starting of the dormancy timer at 234. Thereafter, upon expiration of the dormancy timer at 236, the MS 202 resumes or reactivates the suspended packet session at 240.

While the present disclosure and what are presently considered to be the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

The invention claimed is:

1. A method in a wireless communications device, the method comprising:
   pre-empting an active packet session with an event;
   suspending operation of a dormancy timer initiated upon pre-emption of the active packet session;
   re-starting the suspended dormancy timer upon completion of either a service or application associated with the event pre-empting the active packet session.

2. The method of claim 1, resuming the pre-empted packet session upon expiration of the dormancy timer after re-starting the dormancy timer.

3. The method of claim 1, receiving a network control message with dormancy timer information before suspending the dormancy timer.

4. The method of claim 3, starting the dormancy timer after receiving the network control message.

5. The method of claim 1,
   pre-empting the active packet session with a pending voice call;
   re-starting the suspended dormancy timer upon completion of the voice call associated with pre-empting the packet session.

6. The method of claim 5, receiving a page, conducting the voice call after receiving the page.

7. A method in a wireless communications device, the method comprising:
   pre-empting an active packet session with an event;
   suspending initiation of a dormancy timer that would otherwise be initiated after pre-emption of the packet session;
   initiating the suspended dormancy timer upon completion of either a service or application associated with the event pre-empting the active packet session.

8. The method of claim 7, resuming the pre-empted packet session upon expiration of the dormancy timer initiated upon completion of the service or application associated with the event pre-empting the active packet session.

9. The method of claim 7, receiving a network control message with dormancy timer information before suspending the dormancy timer.

10. The method of claim 9, starting the dormancy timer after receiving the network control message.

11. The method of claim 7,
    pre-empting the active packet session with a pending voice call;
    re-starting the suspended dormancy timer upon completion of the voice call associated with pre-empting the packet session.

12. The method of claim 11, receiving a page, conducting the voice call after receiving the page.

13. A method in a wireless communications device, the method comprising:
    receiving a network control message;

suspending an active packet session of the wireless communication device in response to receiving the network control message;
suspending a dormancy timer after receiving the network control message.

14. The method of claim 13,
receiving a page after receiving the network control message,
conducting a voice call after receiving the page, and
resuming the suspended dormancy timer after completing the voice call.

15. The method of claim 13, suspending the dormancy timer includes suspending initiation of the dormancy timer otherwise started upon suspending the active packet session.

16. The method of claim 13, suspending the dormancy timer includes suspending operation of a dormancy timer after the dormancy timer has started.

17. The method of claim 13, starting the dormancy timer upon completion of an event precipitating the suspension of the active packet session.

* * * * *